O. B. HJORTH.
SPEEDOMETER MAGNET DRIVE.
APPLICATION FILED FEB. 18, 1918.
1,335,833.
Patented Apr. 6, 1920.
Fig. 1.
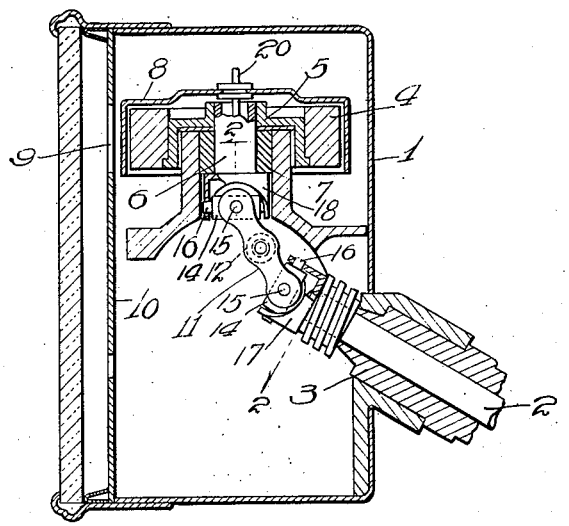
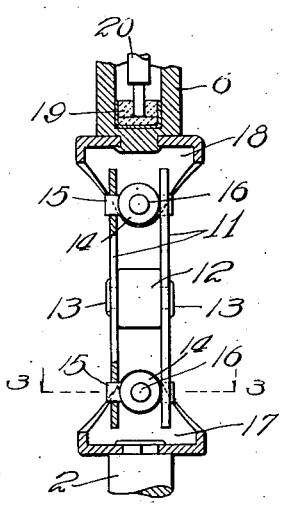
Fig. 2.
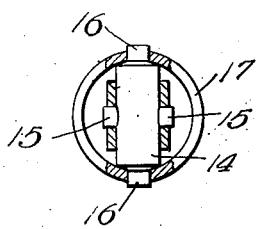
Fig. 3.
Witness:
Inventor:
Oscar B. Hjorth,
by Burton & Burton
his Attys.

UNITED STATES PATENT OFFICE.

OSCAR B. HJORTH, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER-MAGNET DRIVE.

1,335,833.    Specification of Letters Patent.    Patented Apr. 6, 1920.

Application filed February 18, 1918. Serial No. 217,777.

*To all whom it may concern:*

Be it known that I, OSCAR B. HJORTH, a citizen of the United States, residing at Chicago, in the county of Cook and the State of Illinois, have invented certain new and useful Improvements in Speedometer-Magnet Drives, of which the following is a specification, reference being had to the accompanying drawings, forming a part thereof.

The purpose of this invention is to provide a noiseless form of drive connection for transmitting the continuous rotation of a drive shaft to a rotary magnet or other metering element within a speedometer casing, particularly when such shaft and metering elements are journaled upon relatively transverse or oblique axes. The invention consists in the details of construction and arrangement hereinafter described and shown in the drawings as indicated by the claim.

In the drawings:

Figure 1 is an axial vertical section of a speedometer including a drive connection embodying this invention.

Fig. 2 is an enlarged detail view taken as a section at line 2—2 on Fig. 1 and showing particularly the parts embodying the novel drive connection.

Fig. 3 is a detail section taken as indicated at line 3—3 on Fig. 2.

Referring first to Fig. 1, it will be seen that the instrument comprises a casing, 1, which is entered at the back by a drive shaft, 2, in a journal bearing, 3. Within the casing a magnet, 4, of substantially circular outline is shown secured to a carrier, 5, on a shaft, 6, journaled in a bearing, 7, supported within the casing, 1, while the usual non-magnetic drag element appears in the form of an inverted cup-shaped member, 8, having its flange, or skirt, overhanging the magnet, 4, in position to register at window 9, of dial plate, 10, it being understood that said skirt of the member, 8, carries a scale and speed indicating numerals, not shown.

In the particular instrument illustrated, the shaft, 2, is disposed upon an axis oblique to the axis of the magnet shaft, 6, and in such cases it has been the practice heretofore to transmit the rotation of the shaft, 2, to the magnet, through the medium of bevel gears; but as is well understood, it is quite difficult to adjust such gears and maintain them in adjustment so perfect that they will not cause considerable noise, especially if the speed of rotation of the shaft, 2, is rather high. Such noise is of course objectionable, and also is a symptom of undesirable friction and wear in the parts.

A much quieter form of transmission has therefore been devised, embodying a torsion link, composed of a pair of flat bars, 11, permanently assembled in parallel relation and connected by a spacer, 12, having reduced end portions, 13, which are riveted over after passing through apertures respectively at about the middle of the length of each of the bars, 11. Between the bars, 11, at each end, there is carried the block or cross, 14, of a universal joint, having trunnions, 15, engaged in apertures of the bars, 11, and having transversely-disposed trunnions, 16, pivotally carried in the arms of forks, 17, and 18, which are secured respectively to adjacent ends of shaft, 2, and shaft, 6. As shown, the forks, 17 and 18, may be formed of sheet metal drawn into the shape of the cup with the opposite sides partly cut away leaving standing the two portions which form the forks between which the members, 14, are carried. The bottoms of such cup-shaped members, 17 and 18 are apertured and secured to the reduced end portion of the shaft, 2, or 6, as the case may be, by riveting over of such reduced portion. As indicated further in Fig. 2, the shaft, 6, is made hollow for the purpose of accommodating a step jewel bearing, 19, for the spindle, 20, of the oscillatory drag member, 8.

It will be evident that the torsion link formed of the bars, 11, and spacer, 12, connected through the crosses, 14, and forks, 17 and 18, with shafts, 2 and 6, can easily be made to operate without lost motion and that the slight angular movement of the parts upon trunnions, 15, will be substantially noiseless, thus eliminating the objectionable feature of a gear connection.

I claim:

In a speedometer, including a member journaled for rotation, and a drive shaft arranged with its axis at an angle to that of said member, a torsion link composed of two parallel side bars and a spacer connecting them intermediate their ends; forked terminals on the adjacent parts of said member and shaft respectively, and connector blocks trunnioned in each of said forks and in the respective ends of said side bars, constituting universal joint connections for the torsion link to said member and drive shaft respectively.

In testimony whereof I have hereunto set my hand at Chicago, Illinois, this 9th day of February, 1918.

OSCAR B. HJORTH.